(12) United States Patent
Smets et al.

(10) Patent No.: US 9,227,598 B2
(45) Date of Patent: Jan. 5, 2016

(54) WIPER BLADE ADAPTOR DEVICE

(75) Inventors: Kris Smets, Halen (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/994,683

(22) PCT Filed: Nov. 15, 2011

(86) PCT No.: PCT/EP2011/070182
§ 371 (c)(1),
(2), (4) Date: Jun. 14, 2013

(87) PCT Pub. No.: WO2012/079893
PCT Pub. Date: Jun. 21, 2012

(65) Prior Publication Data
US 2013/0305476 A1 Nov. 21, 2013

(30) Foreign Application Priority Data
Dec. 14, 2010 (DE) .................. 10 2010 063 019

(51) Int. Cl.
*B60S 1/40* (2006.01)
*B60S 1/38* (2006.01)

(52) U.S. Cl.
CPC ............. *B60S 1/4003* (2013.01); *B60S 1/387* (2013.01); *B60S 1/3849* (2013.01); *B60S 1/3867* (2013.01); *B60S 1/386* (2013.01); *B60S 1/3851* (2013.01)

(58) Field of Classification Search
CPC .... B60S 1/3848; B60S 1/3849; B60S 1/3867; B60S 1/3851; B60S 1/3865; B60S 1/387; B60S 1/4003; B60S 2001/409

USPC .......... 15/250.32, 250.31, 250.361, 250.201, 15/250.351, 250.43, 250.44
See application file for complete search history.

(56) References Cited

U.S. PATENT DOCUMENTS

| 3,179,969 A * | 4/1965 | Glynn ........................ 15/250.32 |
| 3,254,358 A * | 6/1966 | Wise .......................... 15/250.32 |
| 6,643,889 B1 * | 11/2003 | Kotlarski ................... 15/250.32 |
| 8,186,002 B2 * | 5/2012 | Kinnaert et al. ......... 15/250.201 |
| 2007/0174989 A1 | 8/2007 | Moll et al. |
| 2008/0295273 A1 | 12/2008 | Lin et al. |
| 2009/0199357 A1 * | 8/2009 | Thienard .................... 15/250.32 |
| 2010/0212101 A1 * | 8/2010 | Thienard et al. ........... 15/250.32 |

FOREIGN PATENT DOCUMENTS

| CN | 101311043 | 11/2008 |
| CN | 101883701 | 11/2010 |
| DE | 102006047633 | 4/2008 |
| DE | 102007058091 | 6/2009 |

(Continued)

OTHER PUBLICATIONS

International Search Report for Application No. PCT/EP2011/070182 dated Jan. 24, 2012 (2 pages).

*Primary Examiner* — Gary Graham
(74) *Attorney, Agent, or Firm* — Michael Best & Friedrich LLP

(57) ABSTRACT

The invention is based on a wiper blade adaptor device, in particular for a wiper blade (14), with a wiper blade adaptor (10) and a coupling element (12) for coupling the wiper blade adaptor (10) to a wiper blade (14). It is proposed that the wiper blade adaptor (10) be releasably connected to the coupling element (12).

19 Claims, 3 Drawing Sheets

(56) References Cited

FOREIGN PATENT DOCUMENTS

| DE | 102008001045 | 10/2009 |
|----|--------------|---------|
| EP | 2020351 | 2/2009 |
| EP | 2090479 | 8/2009 |
| FR | 2879986 | 6/2006 |
| FR | 2890026 | 3/2007 |
| FR | 2924080 | 5/2009 |
| FR | 2925437 | 6/2009 |

\* cited by examiner

WIPER BLADE ADAPTOR DEVICE

BACKGROUND OF THE INVENTION

Document DE 10 2007 058 091 A1 has already disclosed a wiper blade adaptor device, in particular for a wiper blade of a motor vehicle, comprising a wiper blade adaptor and a coupling element for coupling the wiper blade adaptor to a wiper blade.

SUMMARY OF THE INVENTION

The invention is based on a wiper blade adaptor device, in particular for a wiper blade of a motor vehicle, comprising a wiper blade adaptor and a coupling element for coupling the wiper blade adaptor to a wiper blade.

It is proposed that the wiper blade adaptor is connected releasably to the coupling element, as a result of which the wiper blade adaptor device can be designed to be fitted and/or to be interchangeable in a particularly simple manner. In this context, a "wiper blade adaptor" is intended to be understood in particular as meaning an adaptor which is provided so as to provide a coupling region of the wiper blade adaptor device for coupling to a wiper arm. In this context, a "coupling element" is intended in particular as meaning an element which is provided to couple the wiper blade adaptor to a component of a wiper blade, such as, in particular, to a strip-shaped carrier element. In this context, "releasably" is intended to be understood in particular as meaning "non-destructively separable". Particularly advantageously, the wiper blade adaptor is releasable and/or fastenable without a tool. In this context, "provided" is intended to be understood in particular as meaning specially configured and/or equipped.

If the coupling element has at least one latching means which is provided so as, in a fitted state, to form a form-fitting connection to the wiper blade adaptor, a low-wearing connection which is simple to release can be produced between the wiper blade adaptor and the coupling element. In this context, a "latching means" is intended to be understood in particular as meaning a means which is provided to produce a latching connection by means of a spring-elastic component which is elastically deflected for installation.

If the latching means is arranged at a free end of the coupling element, the coupling element can be formed particularly stably. In this context, a "free end" is intended in particular as meaning one end of a main longitudinal extent of an element. A "main longitudinal extent" in this context is intended to be understood in particular as meaning as large an extent as possible. In this context, an "extent" of an element is intended to be understood in particular as meaning a maximum distance between two points of a vertical projection of the element onto a plane.

The wiper blade adaptor can be fitted particularly simply and securely if the coupling element has a longitudinal guide unit which is provided to guide the wiper blade adaptor upon a pushing-on movement during installation. In this context, a "longitudinal guide unit" is intended to be understood in particular as meaning a unit which is provided so as to provide guidance of a carrier element in a longitudinal direction. In this context, a "longitudinal direction" is intended to be understood in particular as meaning a direction which extends at least substantially parallel to a main longitudinal extent of the carrier element. In this context, "substantially" is intended as meaning in particular a deviation of less than 10°, preferably of less than 5°. In a further refinement of the invention, it is proposed that the longitudinal guide unit has at least one longitudinal guide element which is formed in one piece with a basic body of the coupling element, as a result of which the wiper blade adaptor can be stably fixed. In this context, a "longitudinal guide element" is intended to be understood in particular as meaning a guide element which extends at least substantially parallel to a longitudinal direction of the coupling element. "In one piece" is intended to be understood in particular as meaning integrally bonded, for example by a welding process and/or adhesive bonding process, etc., and particularly advantageously as meaning integrally formed, such as through production by casting and/or production in a single- or multi-component injection molding process.

Furthermore, it is proposed that the latching means is deflectable substantially perpendicularly to a supporting surface of the coupling element, thus enabling a secure configuration to be achieved.

In a further refinement of the invention, it is proposed that the latching means has at least one spring means which closes off the coupling element in a longitudinal direction, as a result of which the coupling element can be formed particularly stably.

Furthermore, it is proposed that the wiper blade adaptor has an extension which, in a fitted state, forms a form-fitting connection to the latching means. As a result, the latching means can bear against a particularly large contact surface.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

DETAILED DESCRIPTION

Figure 1:
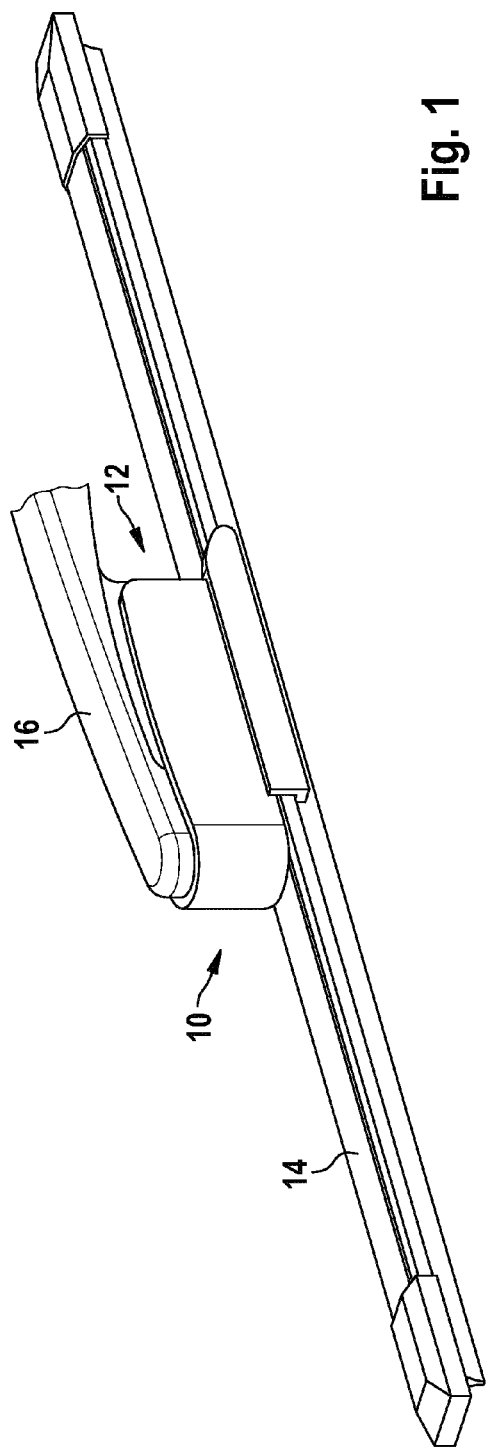
FIG. 1 shows a perspective view of a wiper blade adaptor device according to the invention in a fitted state.

FIG. 1 shows a wiper blade adaptor device according to the invention comprising a wiper blade adaptor 10, a coupling element 12 for coupling the wiper blade adaptor 10 to a wiper blade 14, and a wiper arm 16 in a fitted state. The wiper arm 16 is coupled to the wiper blade adaptor 10 in a manner customary to a person skilled in the art.

The wiper blade adaptor 10 is connected releasably to the coupling element 12. Non-destructive separating of the wiper blade adaptor 10 from the coupling element 12 is therefore possible. The coupling element 12 is fixedly arranged on the wiper blade 14 in a manner known to a person skilled in the art.

Figure 2:
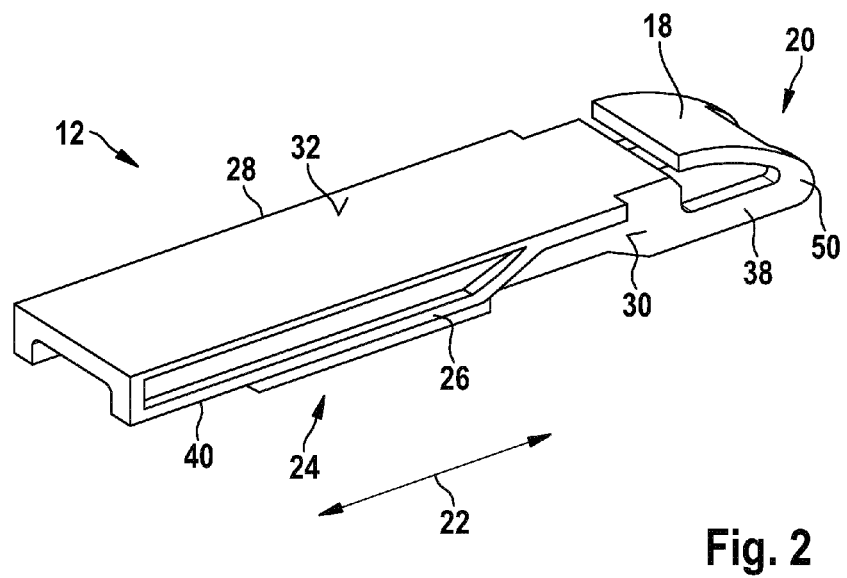
FIG. 2 shows a perspective view of a coupling element of the wiper blade adaptor device according to FIG. 1.

As FIG. 2 shows, the coupling element 12 has a basic body 28 with a supporting surface 32. In an end region 20 of the basic body 28, the coupling element 12 has a latching means 18 at a free end. The latching means 18 is formed in one piece with the coupling element 12. A spring means 38 of the latching means 18 closes off the coupling element 12 in a longitudinal direction 22.

The spring means 38 is formed in one piece with the latching means 18 and the coupling element 12 and has a rounded portion 50 at which particularly high elastic deformation by the latching means 18 is made possible.

The rounded portion 50 rotates the spring means 38 in an unloaded state through 170°. If the latching means 18 is pressed toward the spring means 38, the rotation of the spring means 38 is increased. As a result, the latching means 18 can be elastically deflected perpendicularly to the supporting surface 32 from a starting position.

Furthermore, the coupling element 12 has a longitudinal guide unit 24. The longitudinal guide unit 24 comprises two longitudinal guide elements 26 which are formed in one piece with the basic body 28. In this case, the longitudinal guide elements 26 form a part of opposite side walls 30 of the basic body 28. The longitudinal guide elements 26 form a lower edge 40 of the basic body 28 which serves as a bearing for the wiper blade adaptor 10. The supporting surface 32 closes off the coupling element 12 upward. Upon installation with the wiper blade adaptor 10, the latter rests on the supporting surface 32.

Figure 3:
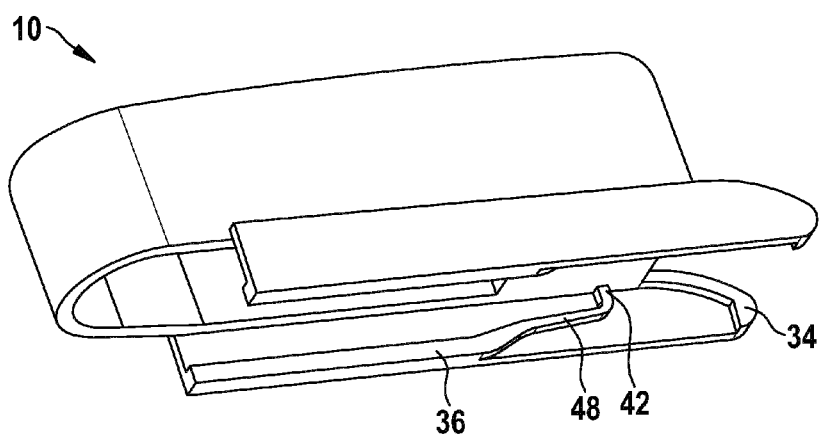
FIG. 3 shows a perspective view of a wiper blade adaptor of the wiper blade adaptor device according to FIG. 1.

The wiper blade adaptor 10 has skirt-shaped side guide means 48 laterally. A guide means 36 extends on each of the side guide means 48, for the most part in the longitudinal direction 22, as shown in FIG. 3. The guide means 36 ends at one end with a locking cam 42. The locking cam 42 serves as a stop for the coupling element 12 during installation. Furthermore, an extension 34 which has a curved contour is integrally formed on each side guide means 48.

Figure 4:
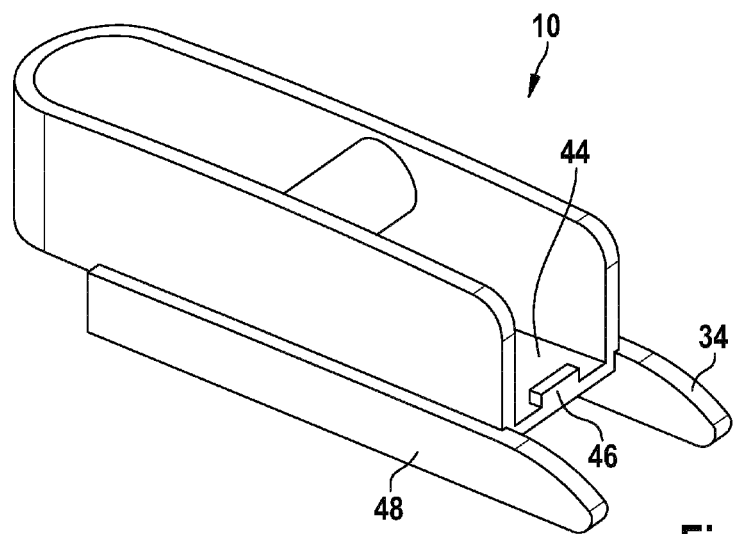
FIG. 4 shows a further perspective view of the wiper blade adaptor according to FIG. 3.

In a fitted state, each extension 34 forms a form-fitting connection to the latching means 18. As furthermore shown in FIG. 4, a latching stop 46 which forms a stop for the latching means 18 is integrally formed on a base plate 44 of the wiper blade adaptor 10. The base plate 44 is adjacent in a flush manner to the side guide means 48. In a fitted state, the base plate 44 rests on the supporting surface 32 of the coupling element 12.

Figure 5:
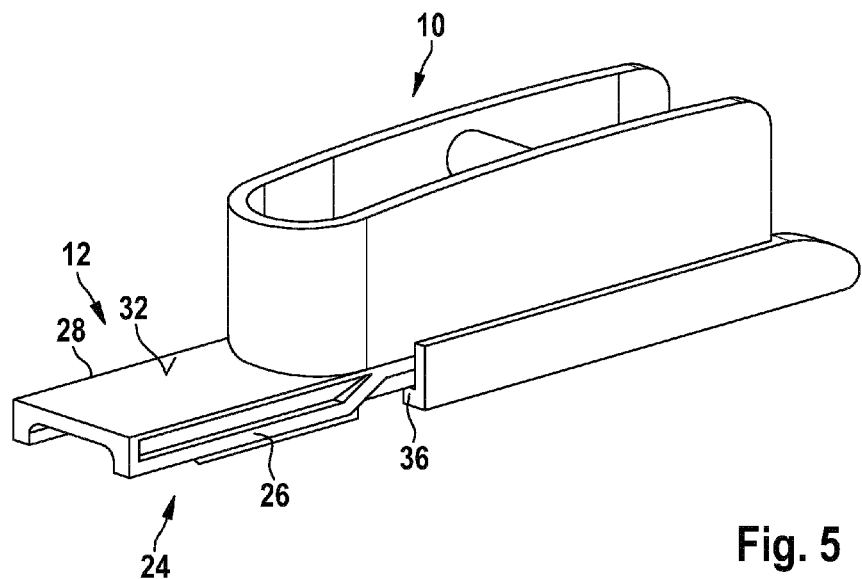
FIG. 5 shows a perspective view of the wiper blade adaptor device according to FIG. 1 in an installation step.

In order to couple the wiper blade adaptor 10 to the coupling element 12, the wiper blade adaptor 10 is received by the longitudinal guide unit 24 of the coupling element 12 in a pushing-on movement, as shown in FIG. 5. In this case, the guide means 36 adjoin the longitudinal guide element 26 of the coupling element 12 in a flush manner. The side guide means 48 surround the basic body 28 and reach under the lower edge 40.

During the pushing-on movement, the latching means 18 is elastically deflected out of a starting position perpendicular to the supporting surface 32 of the coupling element 12 by the base plate 44 of the wiper blade adaptor 10. After the base plate 44 has been pushed over the latching means 18, the latching means 18 automatically moves back into the starting position thereof. In the process, it forms a form-fitting connection to the extension 34 of the wiper blade adaptor 10. Furthermore, the latching means 18 bears flush against the latching stop 46.

In a fitted state, the basic body 28 bears against the locking cam 42. This avoids the wiper blade adaptor 10 being pushed too far onto the coupling element 12. The wiper blade adaptor 10 is now fixedly connected to the coupling element 12.

In order to release the wiper blade adaptor 10 from the coupling element 12 again, the latching element 18 has to be pressed downward, i.e. perpendicularly to the supporting surface 32. For as long as the latching element 18 is deflected, the wiper blade adaptor 10 can be pushed out of the fitted state and removed in an analogous manner to installation.

The invention claimed is:

1. A wiper blade adaptor device, comprising a wiper blade adaptor (10) and a coupling element (12) for coupling the wiper blade adaptor (10) to a wiper blade (14), characterized in that the wiper blade adaptor (10) is connected releasably to the coupling element (12), wherein the coupling element (12) has a basic body (28) and at least one latching means (18) which is arranged at a free end of the coupling element (12) and which is configured to form, in a fitted state, a form-fitting connection to the wiper blade adaptor (10), and wherein the wiper blade adaptor has a skirt-shaped side guide (48) which surrounds the basic body (28), wherein the coupling element (12) has a longitudinal guide unit (24) which is provided to wide the wiper blade adaptor (10) upon a pushing-on movement during installation, wherein the longitudinal guide unit (24) comprises two longitudinal guide elements (26) which are formed in one piece with the basic body, each of the longitudinal guide elements forming a part of a respective one of opposite side walls (30) of the basic body, wherein the longitudinal guide elements form a lower edge (40) of the basic body which serves as a bearing for the wiper blade adaptor, wherein, in order to couple the wiper blade adaptor to the coupling element, the wiper blade adaptor is received by the longitudinal guide unit of the coupling element in the pushing-on movement, such that the side guide adjoins the longitudinal guide elements of the coupling element and the side guide surrounds the basic body (28) and reaches under the lower edge (40), and wherein a guide member (36) extends generally longitudinally on each of the side guides, each guide member ending at one end with a locking cam (42) that serves as a stop for the coupling element (12) during installation.

2. The wiper blade adaptor device as claimed in claim 1, characterized in that at least one of the longitudinal guide elements (26) is formed in one piece with the basic body (28) of the coupling element (12).

3. The wiper blade adaptor device as claimed in claim 1, characterized in that the latching means (18) is deflectable substantially perpendicularly to a supporting surface (32) of the coupling element (12).

4. The wiper blade adaptor device as claimed in claim 1, characterized in that the latching means (18) has at least one spring (38) which closes off the coupling element (12) in a longitudinal direction (22).

5. The wiper blade adaptor device as claimed in claim 1, characterized in that the wiper blade adaptor (10) has an extension (34) which, in the fitted state, forms a form-fitting connection to the latching means (18).

6. The wiper blade adaptor device as claimed in claim 1 wherein an extension (34) which has a curved contour is integrally formed on each of the side guides (48), and wherein, in the fitted state, each extension (34) forms a form-fitting connection to the latching means (18).

7. The wiper blade adaptor device as claimed in claim 1 wherein, during the pushing-on movement, each guide member adjoins an associated longitudinal guide element (26) of the coupling element in a flush manner, and the side guides (48) surround the basic body (28) and reach under the lower edge (40).

8. A wiper blade adaptor device, comprising a wiper blade adaptor (10) and a coupling element (12) for coupling the wiper blade adaptor (10) to a wiper blade (14), characterized in that the wiper blade adaptor (10) is connected releasably to the coupling element (12), wherein the coupling element (12) has a basic body (28) and at least one latching means (18)

which is arranged at a free end of the coupling element (12) and which is configured to form, in a fitted state, a form-fitting connection to the wiper blade adaptor (10), and wherein the wiper blade adaptor has a skirt-shaped side guide (48) which surrounds the basic body (28), wherein the coupling element (12) has a longitudinal guide unit (24) which is provided to guide the wiper blade adaptor (10) upon a pushing-on movement during installation, wherein the longitudinal guide unit (24) comprises two longitudinal guide elements (26) which are formed in one piece with the basic body, each of the longitudinal guide elements forming a part of a respective one of opposite side walls (30) of the basic body, wherein the longitudinal guide elements form a lower edge (40) of the basic body which serves as a bearing for the wiper blade adaptor, wherein, in order to couple the wiper blade adaptor to the coupling element, the wiper blade adaptor is received by the longitudinal guide unit of the coupling element in the pushing-on movement, such that the side guide adjoins the longitudinal guide elements of the coupling element and the side guide surrounds the basic body (28) and reaches under the lower edge (40), wherein an extension (34) which has a curved contour is integrally formed on each of the side guides (48), wherein, in the fitted state, each extension (34) forms a form-fitting connection to the latching means (18), and wherein the latching means (18) has at least one spring (38) which closes off the coupling element (12) in a longitudinal direction (22), the spring being formed in one piece with the latching means, and wherein the coupling element has a rounded portion (50) permitting high elastic deformation by the latching means, the rounded portion and the latching means having a curved contour matching a curved contour of the extension.

9. The wiper blade adaptor device as claimed in claim 8 wherein, during the pushing-on movement, the latching means is elastically deflected out of a starting position perpendicular to the supporting surface (32) of the coupling element by a base plate of the wiper blade adaptor, and wherein, after the base plate has been pushed over the latching means, the latching means automatically moves back into the starting position, forms a form-fitting connection to the extension (34) of the wiper blade adaptor, and bears flush against a latching stop (46) on the base plate.

10. The wiper blade adaptor device as claimed in claim 9 wherein, in order to release the wiper blade adaptor from the coupling element, the latching means is pressed downward, perpendicularly to the supporting surface (32), permitting the wiper blade adaptor to be pushed out of the fitted state.

11. The wiper blade adaptor device as claimed in claim 8, characterized in that at least one of the longitudinal guide elements (26) is formed in one piece with the basic body (28) of the coupling element (12).

12. The wiper blade adaptor device as claimed in claim 8, characterized in that the latching means (18) is deflectable substantially perpendicularly to a supporting surface (32) of the coupling element (12).

13. The wiper blade adaptor device as claimed in claim 8, characterized in that the latching means (18) has at least one spring (38) which closes off the coupling element (12) in a longitudinal direction (22).

14. The wiper blade adaptor device as claimed in claim 8, characterized in that the wiper blade adaptor (10) has an extension (34) which, in the fitted state, forms a form-fitting connection to the latching means (18).

15. A wiper blade adaptor device, comprising a wiper blade adaptor (10) and a coupling element (12) for coupling the wiper blade adaptor (10) to a wiper blade (14), characterized in that the wiper blade adaptor (10) is connected releasably to the coupling element (12), wherein the coupling element (12) has a basic body (28) and at least one latching means (18) which is arranged at a free end of the coupling element (12) and which is configured to form, in a fitted state, a form-fitting connection to the wiper blade adaptor (10), and wherein the wiper blade adaptor has a skirt-shaped side guide (48) which surrounds the basic body (28), wherein the coupling element (12) has a longitudinal guide unit (24) which is provided to guide the wiper blade adaptor (10) upon a pushing-on movement during installation, wherein the longitudinal guide unit (24) comprises two longitudinal guide elements (26) which are formed in one piece with the basic body, each of the longitudinal guide elements forming a part of a respective one of opposite side walls (30) of the basic body, wherein the longitudinal guide elements form a lower edge (40) of the basic body which serves as a bearing for the wiper blade adaptor, wherein, in order to couple the wiper blade adaptor to the coupling element, the wiper blade adaptor is received by the longitudinal guide unit of the coupling element in the pushing-on movement, such that the side guide adjoins the longitudinal guide elements of the coupling element and the side guide surrounds the basic body (28) and reaches under the lower edge (40), and wherein a latching stop (46) which forms a stop for the latching means is integrally formed on a base plate (44) of the wiper blade adaptor, the base plate being adjacent in a flush manner to the side guide, and, in the fitted state, the base plate resting on a supporting surface (32) of the coupling element.

16. The wiper blade adaptor device as claimed in claim 15, characterized in that at least one of the longitudinal guide elements (26) is formed in one piece with the basic body (28) of the coupling element (12).

17. The wiper blade adaptor device as claimed in claim 15, characterized in that the latching means (18) is deflectable substantially perpendicularly to a supporting surface (32) of the coupling element (12).

18. The wiper blade adaptor device as claimed in claim 15, characterized in that the latching means (18) has at least one spring (38) which closes off the coupling element (12) in a longitudinal direction (22).

19. The wiper blade adaptor device as claimed in claim 15, characterized in that the wiper blade adaptor (10) has an extension (34) which, in the fitted state, forms a form-fitting connection to the latching means (18).

* * * * *